Figure 1:
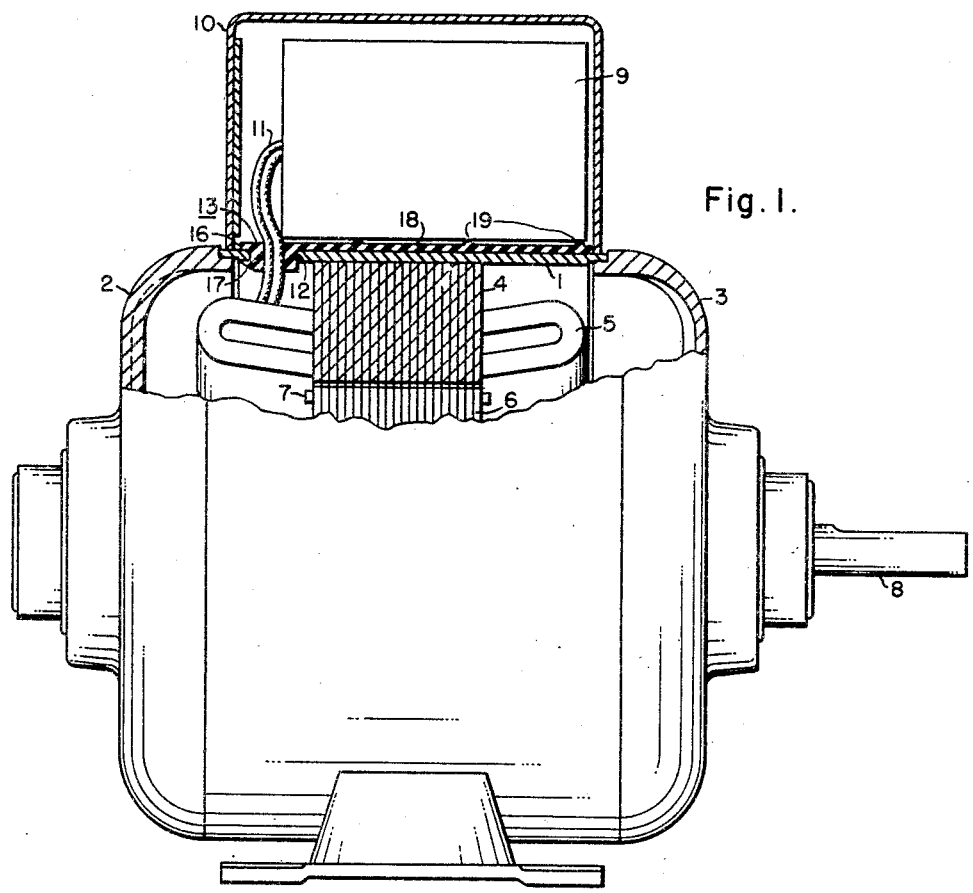

May 31, 1955 M. G. POTTER 2,709,761
CAPACITOR MOUNTING FOR ELECTRIC MOTORS
Filed Oct. 29, 1953

INVENTOR
Marion G. Potter
BY
ATTORNEY ated May 31, 1955

2,709,761

CAPACITOR MOUNTING FOR ELECTRIC MOTORS

Marion G. Potter, Lima, Ohio, assignor to Westinghouse Electric Corporation, East Pittsburgh, Pa., a corporation of Pennsylvania Application October 29, 1953, Serial No. 389,065

4 Claims. (Cl. 310—72)

The present invention relates to electric motors and, more particularly, to the construction of motors of the capacitor type.

In single-phase motors of the capacitor type, a capacitor is employed to produce the necessary phase displacement between the currents in the main and auxiliary primary windings, and the capacitor is preferably mounted directly on the motor. In the usual construction, the capacitor is supported on top of the frame of the motor and enclosed in a suitable housing which is secured to the motor frame. An opening is provided in the frame adjacent the capacitor for the capacitor leads to pass through into the motor to be connected internally in the motor circuit, and means must be provided to protect the leads from the sharp edges of the opening in order to prevent possible damage to the insulation and grounding or short-circuiting of the leads. This has usually been done by placing a fiber bushing in the opening with its ends spun over on both the inside and outside of the frame to hold the bushing in place. This involves some difficulty, however, in spinning over the end of the bushing inside the frame, and if the primary windings are placed in the slots of the stator core before the core is inserted in the frame, it is impossible to use a bushing of this type because the winding prevents spinning the inside end of the bushing after the core is inserted. Some other means of protecting the leads must, therefore, be provided.

It is also necessary in motors of this type to provide some means for supporting the capacitor on the frame so that it is firmly held against the frame and cannot move or rattle in its housing. This has been done by placing a pad of some suitable material, such as felt or cork, between the capacitor and frame so that the capacitor can be held firmly against the frame by engagement with its housing, or otherwise, and is prevented from rattling. This pad is usually cemented to the frame, and this construction requires applying cement to the pad manually and holding the pad in place on the frame until the cement has set sufficiently to hold the pad. This, of course, is a time-consuming and relatively expensive operation and is, therefore, undesirable.

The principal object of the present invention is to provide a capacitor motor in which the capacitor is mounted on the motor frame, and the capacitor leads are protected and the capacitor supported against rattling in a simple and inexpensive manner.

A further object of the invention is to provide a capacitor motor having the capacitor mounted on the frame and having a simple and inexpensive resilient grommet which protects the capacitor leads where they pass through the frame and which also provides a resilient pad between the capacitor and the frame.

Figure 2:
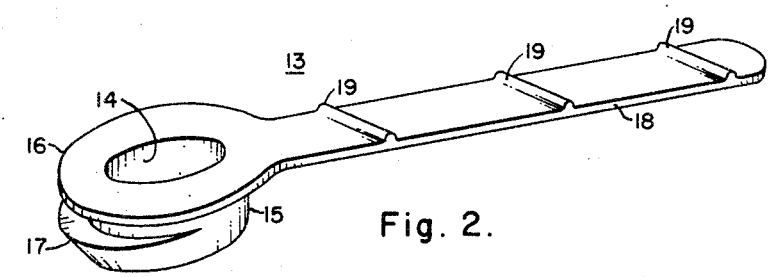

Other objects and advantages of the invention will be apparent from the following detailed description, taken in connection with the accompaning drawing, in which:

Figure 1 is a view, partly in elevation and partly in longitudinal section, showing a motor embodying the invention; and Fig. 2 is a perspective view of a grommet.

The invention is shown in the drawing, for the purpose of illustration, applied to a capacitor motor of more or less usual construction.

The motor shown in the drawing has a generally cylindrical frame 1 closed at the ends by end brackets 2 and 3 which may be secured to the frame in any usual or suitable manner. A laminated stator core 4 is supported in the frame 1 and primary windings 5 of any suitable type are placed in slots in the core 4. The rotor member of the motor includes a laminated rotor core 6 carrying a squirrel-cage winding indicated at 7. The core 6 is mounted on a shaft 8 supported in bearings in the end brackets 2 and 3.

The capacitor 9, which is utilized to produce a phase displacement between the currents in the main and auxiliary primary windings of the motor, is placed on top of the frame 1, and is preferably enclosed in a sheet metal housing 10 which is attached to the frame 1 by any desired means. The capacitor 9 may be retained in place by engagement with the housing 10 or in any other suitable manner. The leads 11 of the capacitor pass through an opening 12 in the frame 1 for connection to the motor windings and, as explained above, it is necessary to protect the leads from the sharp edges of the opening 12 to prevent possible damage to the insulation and resultant risk of grounding or short-circuiting the leads.

In accordance with the invention, this protection, and the necessary resilient pad between the capacitor and the frame, are provided by means of a resilient grommet 13 which may be made of rubber or of any suitable synthetic elastomeric material. As clearly shown in Fig. 2, the grommet 13 is an annular member having a central opening or bore 14 for passage of the leads 11, and having a body portion 15 with an outside diameter such that the grommet fits snugly in the opening 12. A radial flange 16 extends entirely around the body portion 15 of the grommet on the upper end, that is, the end which is on the outside of the frame 1. A radial flange 17 extends approximately half-way around the grommet on the lower or inner end, the ends of the flange 17 merging into the body portion 15, as clearly shown in Fig. 2. The flange 17 is tapered in the axial direction of the grommet to facilitate insertion of the grommet in the opening 12.

The outer flange 16 is provided with an elongated extending portion 18 at the side of the grommet opposite to the partial flange 17. The elongated extending portion 18 is made of sufficient length and width to serve as a pad between the capacitor 9 and the frame 1, and thus an integral pad and grommet are provided.

The extending portion 18 preferably has a plurality of ribs 19 extending transversely on its upper side in order to increase the effective thickness and to permit greater variation in the thickness. It will be understood that the grommet must be made of material which is sufficiently hard to enable the grommet to hold itself in place during assembly of the motor, and if the pad 18 were made of the desired thickness and of a material of the necessary hardness, it would not be sufficiently compressible under all conditions of assembly. The use of the ribs 19 makes it possible to provide the desired effective thickness and still obtain the necessary compressibility.

It will be evident that the grommet 13 can easily and quickly be assembled in place by pressing the body portion 15 through the opening 12, this operation being facilitated because of the tapering of the flange 17 and the fact that the flange 17 extends only part way around the grommet. The grommet is thus easily inserted in the frame, and the two flanges 16 and 17 cooperate to hold it in place during assembly. The extension 18 of the flange 16 extends longitudinally of the motor to provide a pad between the capacitor and the frame, so that the capacitor can be firmly held in place without rattling or looseness, and thus an effective pad is provided without the time-consuming operation of cementing a separate pad to the frame, which has previously been necessary. After assembly of the motor is completed, the capacitor 9 itself holds the grommet in position, so that the chief function of the partial flange 17 is to assist in holding the grommet in place during assembly.

It should now be apparent that a relatively simple and inexpensive means has been provided for protecting the leads of a capacitor where they pass through the frame into the interior of the motor, and for also providing a resilient pad between the capacitor and the frame. This result is obtained by the use of the resilient grommet 13 which is a relatively inexpensive member and which can be quickly and easily applied to the motor during assembly. A particular embodiment of the invention has been shown and described for the purpose of illustration, but it will be apparent that various modifications and other embodiments are possible within the scope of the invention, and it is to be understood that the invention is not limited to the specific details of construction shown but includes all equivalent embodiments and modifications.

I claim as my invention:

1. An electric motor having stator and rotor members, the stator member including a frame member, a capacitor supported directly on the frame member, the frame member having an opening therethrough adjacent the capacitor for the passage of leads, and a resilient annular grommet fitting in said opening, the grommet having an elongated portion extending therefrom longitudinally of the motor between the frame member and the capacitor.

2. An electric motor having stator and rotor members, the stator member including a frame member, a capacitor supported directly on the frame member, the frame member having an opening therethrough adjacent the capacitor for the passage of leads, and a resilient annular grommet fitting in said opening, the grommet having a flange on the outside of the frame member extending entirely around the grommet, and having a flange on the inside of the frame member extending only part way around the grommet.

3. An electric motor having stator and rotor members, the stator member including a frame member, a capacitor supported directly on the frame member, the frame member having an opening therethrough adjacent the capacitor for the passage of leads, and a resilient annular grommet fitting in said opening, the grommet having a flange on the outside of the frame member extending entirely around the grommet, and having a flange on the inside of the frame member extending only part way around the grommet, and the grommet having an elongated portion on the outside of the frame member extending longitudinally of the motor between the frame member and the capacitor.

4. An electric motor having stator and rotor members, the stator member including a frame member, a capacitor supported directly on the frame member, the frame member having an opening therethrough adjacent the capacitor for the passage of leads, and a resilient annular grommet fitting in said opening, the grommet having a flange on the outside of the frame member extending entirely around the grommet, and having a flange on the inside of the frame member extending only part way around the grommet, and the grommet having an elongated portion on the outside of the frame member extending longitudinally of the motor between the frame member and the capacitor, said elongated portion having a plurality of ribs extending transversely across it.

References Cited in the file of this patent

UNITED STATES PATENTS

| | | |
|---|---|---|
| 1,619,201 | Fried | Mar. 1, 1927 |
| 2,003,031 | Baker | May 28, 1935 |
| 2,650,855 | Peirce | Sept. 1, 1953 |